(12) United States Patent
Ortigosa Vallejo et al.

(10) Patent No.: US 7,793,849 B2
(45) Date of Patent: *Sep. 14, 2010

(54) CONTACTLESS IDENTIFICATION DEVICE

(76) Inventors: Juan Ignacio Ortigosa Vallejo, C/ Conchita Supervia 17, 3-1, Barcelona (ES) 08028; Carles Puente Baliarda, c/ Londres, 57 4o2a, Barcelona (ES) 08036

( * ) Notice: Subject to any disclaimer, the term of this patent is extended or adjusted under 35 U.S.C. 154(b) by 0 days.

This patent is subject to a terminal disclaimer.

(21) Appl. No.: 12/263,718

(22) Filed: Nov. 3, 2008

(65) Prior Publication Data

US 2009/0101722 A1    Apr. 23, 2009

Related U.S. Application Data

(63) Continuation of application No. 11/789,724, filed on Apr. 24, 2007, now Pat. No. 7,520,440, which is a continuation of application No. 10/858,457, filed on Jun. 1, 2004, now Pat. No. 7,222,798, which is a continuation of application No. PCT/EP01/014453, filed on Dec. 10, 2001.

(51) Int. Cl.
*G06K 19/05* (2006.01)

(52) U.S. Cl. ..................... 235/492; 235/494

(58) Field of Classification Search ................ 235/375, 235/487, 492, 494

See application file for complete search history.

(56) References Cited

U.S. PATENT DOCUMENTS

| | | | |
|---|---|---|---|
| 5,172,084 A | 12/1992 | Fiedziuszko et al. | |
| 5,337,063 A | 8/1994 | Takahira | |
| 6,140,975 A | 10/2000 | Cohen | |
| 6,147,655 A | 11/2000 | Roesner | |
| 6,285,342 B1 | 9/2001 | Brady et al. | |
| 6,366,260 B1 | 4/2002 | Carrender | |
| 6,421,013 B1 | 7/2002 | Chung | |
| 6,535,175 B2 | 3/2003 | Brady et al. | |
| 6,563,463 B1 | 5/2003 | Saito | |
| 6,677,917 B2 | 1/2004 | Van Heerden et al. | |
| 6,745,945 B1 | 6/2004 | Limelette et al. | |
| 6,870,507 B2 | 3/2005 | Anguera Pros et al. | |
| 7,222,798 B2 * | 5/2007 | Ortigosa Vallejo et al. | .. 235/492 |
| 7,520,440 B2 * | 4/2009 | Ortigosa Vallejo et al. | .. 235/492 |
| 2002/0005433 A1 | 1/2002 | Nochi et al. | |
| 2003/0142036 A1 | 7/2003 | Wilhelm et al. | |

(Continued)

FOREIGN PATENT DOCUMENTS

DE    19500925 A1    7/1996

(Continued)

OTHER PUBLICATIONS

Xianming Qing, et al., "A Novel Single-Feed Circular Polarized Slotted Loop Antenna", 1999, IEEE, (4 pages).

*Primary Examiner*—Daniel St.Cyr

(57) ABSTRACT

A contactless identification device includes a flat conducting structure as an electromagnetic sensor or transducer. An electromagnetic sensor architecture is suitable for all applications where contactless or hybrid cards are of advantage: high volume paying and toll applications (public transportation, public sport events, person and good identification, access to controlled areas, control of shipment of goods, handling of luggage, product control in chain production environments), etc. The contact-less identification device has had its performance enhanced by the use of space-filling techniques in the design of its electromagnetic sensor and by the use of a planar capacitor in conjunction with said flat conducting structure.

16 Claims, 11 Drawing Sheets

U.S. PATENT DOCUMENTS

2004/0217916 A1  11/2004  Quintero Illera et al.

FOREIGN PATENT DOCUMENTS

| WO | 00/34916 A1 | 6/2000 |
|---|---|---|
| WO | 01/04957 A1 | 1/2001 |
| WO | WO-01/22528 | 3/2001 |
| WO | WO-01/54221 | 7/2001 |
| WO | WO-01/54225 | 7/2001 |
| WO | 02/01495 A1 | 1/2002 |

* cited by examiner

CONTACTLESS IDENTIFICATION DEVICE

CROSS-REFERENCE TO RELATED APPLICATIONS

This patent application is a continuation application of U.S. patent application Ser. No. 11/789,724, which was filed on Apr. 24, 2007, now U.S. Pat. No. 7,520,440. U.S. patent application Ser. No. 11/789,724 is a continuation application of U.S. patent application Ser. No. 10/858,457, which was filed Jun. 1, 2004 now U.S. Pat. No. 7,222,798. U.S. patent application Ser. No. 10/858,457 is a continuation application of International Patent Application No. PCT/EP01/014453, which was filed on Dec. 10, 2001. U.S. patent application Ser. No. 11/789,724, U.S. patent application Ser. No. 10/858,457, and International Patent Application No. PCT/EP01/014453 are incorporated herein by reference.

BACKGROUND OF THE INVENTION

1. Technical Field

The invention relates, in general, to a contact-less identification device comprising a flat conducting structure as an electromagnetic sensor or transducer, and more particularly the invention relates to contactless cards, hybrid cards and radio operated electronic labels and tags. The electromagnetic sensor architecture according to the invention is suitable for all the applications where contactless or hybrid cards are of advantage: high volume paying and toll applications (public transportation, public sport events, person and good identification, access to controlled areas, control of shipment of goods, handling of luggage, product control in chain production environments), etc.

The contact-less identification device has had its performance enhanced by the use of space-filling techniques in the design of its electromagnetic sensor and by the use of a planar capacitor in conjunction with said flat conducting structure.

2. History of Related Art

The use of Integrated Circuit (IC) cards has been going on for several years in multiple applications. These applications range, in terms of complexity, from simple token-wise payment applications in private environments to complex and intrinsically secure electronic banking applications including powerful encryption and decryption mechanisms. The interaction of the IC in the card with the reader is made through a set of metallic contacts on the surface of the card.

The public interest in many of today's applications of IC cards is greatly increased if the operation of the card does not require a mechanical interaction of the user with the reading device, thus allowing a much faster operation and an increased roughness of the reader that reflects in an increase in the reliability of the system. This is one of the main reasons for the development, which continues today with new standards being defined and tested, of the contactless operation of IC cards and electronic labels or tags.

There has been some effort put in the development of the electromagnetic sensor to be used in the contactless operation of the cards, but the outcome of this development has been the design of the electromagnetic sensor architectures that are not optimally using the available space within the card or tag.

In low frequency applications, where the coupling of the IC chip to the contactless reader is made via an inductive coupling, the most common solution has been the use of multiple-turn coils (see (2) in FIG. 10), which imply quite a complicated manufacturing process because of the fact that the two ends of the coils are located in different sides with respect to the coil windings (see bridge (3) in FIG. 10). Other simpler solutions such as (1) are convenient in terms of manufacturing simplicity, but feature a poor in performance.

In applications at higher frequencies, the minimum size of the electromagnetic sensor is determined by the wavelength at the operation frequency, and this fact implies that there is a clear compromise between the performance of the electromagnetic sensor and its size. This compromise has been solved with a limitation of the electromagnetic sensor size to values that are suitable for the final product, at the expense of obtaining electromagnetic sensor performances that are far from optimal.

The set of geometries named Space-Filling Curves (hereinafter SFC) were described in the patent publication WO 01/54225 wherein said space-filling curve was defined as a curve composed by at least ten connected straight segments, wherein said segments are smaller than a tenth of the operating free-space wave length and they are spatially arranged in such a way that none of said adjacent and connected segments form another longer straight segment, wherein non of said segments intersect to each other except optionally at the tips of the curve, wherein the corners formed by each pair of said adjacent segments can be optionally rounded or smoothed otherwise, and wherein the curve can be optionally periodic along a fixed straight direction of space $f$ and only if the period is defined by a non-periodic curve composed by at least ten connected segments and no pair of said adjacent and connected segments define a straight longer segment.

In said document the space-filling curve features a box-counting dimension larger than one, being said box-counting dimension computed as the slope of the straight portion of a log-log graph, wherein such a straight portion is substantially defined as a straight segment over at least an octave of scales on the horizontal axes of the log-log graph.

SUMMARY OF THE INVENTION

The present invention optimizes the performance of the electromagnetic sensor or inductive element used in the contactless cards, hybrid cards and radio frequency operated labels and tags by incorporating a capacitive element connected in parallel to the electromagnetic sensor and by including in the design of the electromagnetic sensor geometry, in the capacitive element geometry, or in both cases the use of space-filling curves (SFC). This allows an optimal utilization of the limited area and volume within the card or label.

This invention is aimed at two main goals: on one hand, it presents a new procedure to improve the performance of electromagnetic sensors designed for inductive coupling, and on the other hand this invention portrays the advantages of using space-filling curves in order to optimize the solution to the performance-size compromise in applications for radiation coupling.

In applications where the radio frequency operation of the device implies an inductive coupling of the sensor to the electromagnetic field generated by the coupling device (the card/label reader), this method allows the optimization the electromagnetic sensor inductance (the main characteristic of the electromagnetic sensor for this type of coupling) in several ways:

First: By the use of SFC, the length of the electromagnetic sensor or inductive element can be substantially increased without exceeding the area allowed in the card or label for the deployment of the electromagnetic sensor, thus increasing the inductance of the electromagnetic sensor or inductive element.

Second: By the inclusion of a suitably designed capacitive element connected in parallel to the electromagnetic sensor, the effective inductance that the pair capacitance/inductance presents to the card integrated circuit can be increased without affecting other operation parameters.

Third: By the optimization of the inductance value of the electromagnetic sensor it is possible to achieve values of this parameter that are suitable for the operation of the contactless or hybrid card or the radio operated electronic label without having to use multiple-turn loops. This possibility is very interesting because it makes it possible to locate the two connection terminals of the electromagnetic sensor or inductive element in the internal region of the loop without the need to have a conductive path crossing over the loops, thus greatly simplifying the manufacturing techniques.

Fourth: Because of the above-mentioned features, contactless cards, hybrid cards and radio frequency operated labels and tags can be reduced in size with respect to prior art.

Fifth: Because of the above-mentioned features, contactless cards, hybrid cards and radio frequency operated labels and tags can be operated from a longer distance to the card detection device compared to those in the prior art.

In applications working at higher frequencies, where the operation of the device implies a radiation coupling (more that an inductive coupling) to the electromagnetic field generated by the coupling device (the card/label reader), this method allows an optimization of the electromagnetic sensor performance by allowing a reduction in the electromagnetic sensor size required for it to operate at the working frequency.

By the use of SFC's in this method, the use of the area where the electromagnetic sensor is being deployed is optimized, as the space-filling curves are able to pack a longer length in a smaller space than conventional curves (as meander-like curves or spiral curves).

In terms of manufacturing suitability, the fact that the electromagnetic sensor or inductive element can be manufactured without the need to cross over conductive paths allows the manufacturing of the electromagnetic sensor with a single layer construction method.

BRIEF DESCRIPTION OF THE DRAWINGS

A more complete understanding of the present invention may be obtained by reference to the following Detailed Description, when taken in conjunction with the accompanying Drawings, wherein.

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1:
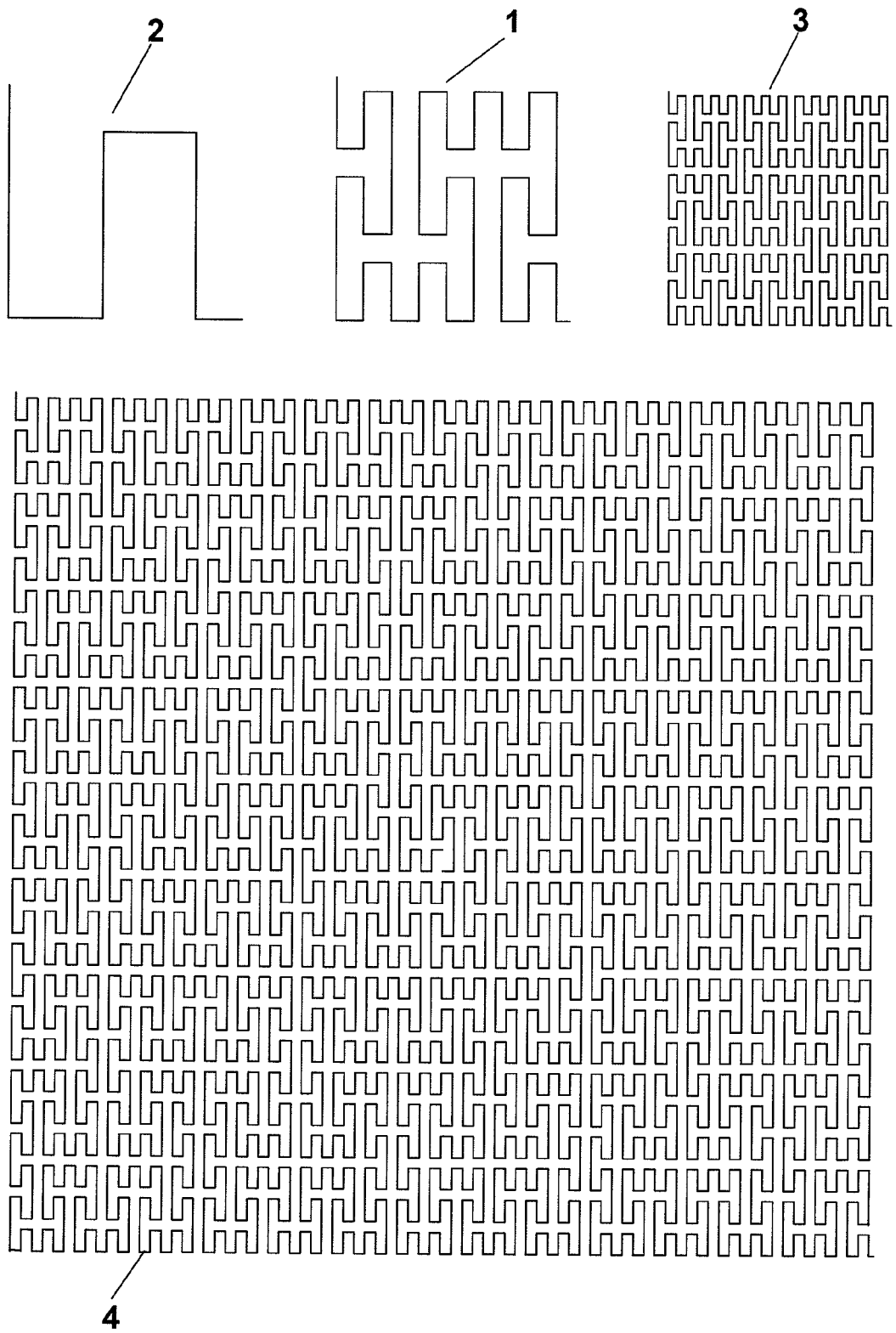
FIG. 1 shows some particular cases of SFC curves. From an initial curve 2, other curves 1, 3 and 4 with more than 10 connected segments are formed. This particular family of curves are named hereafter SZ curves.
Figure 2:
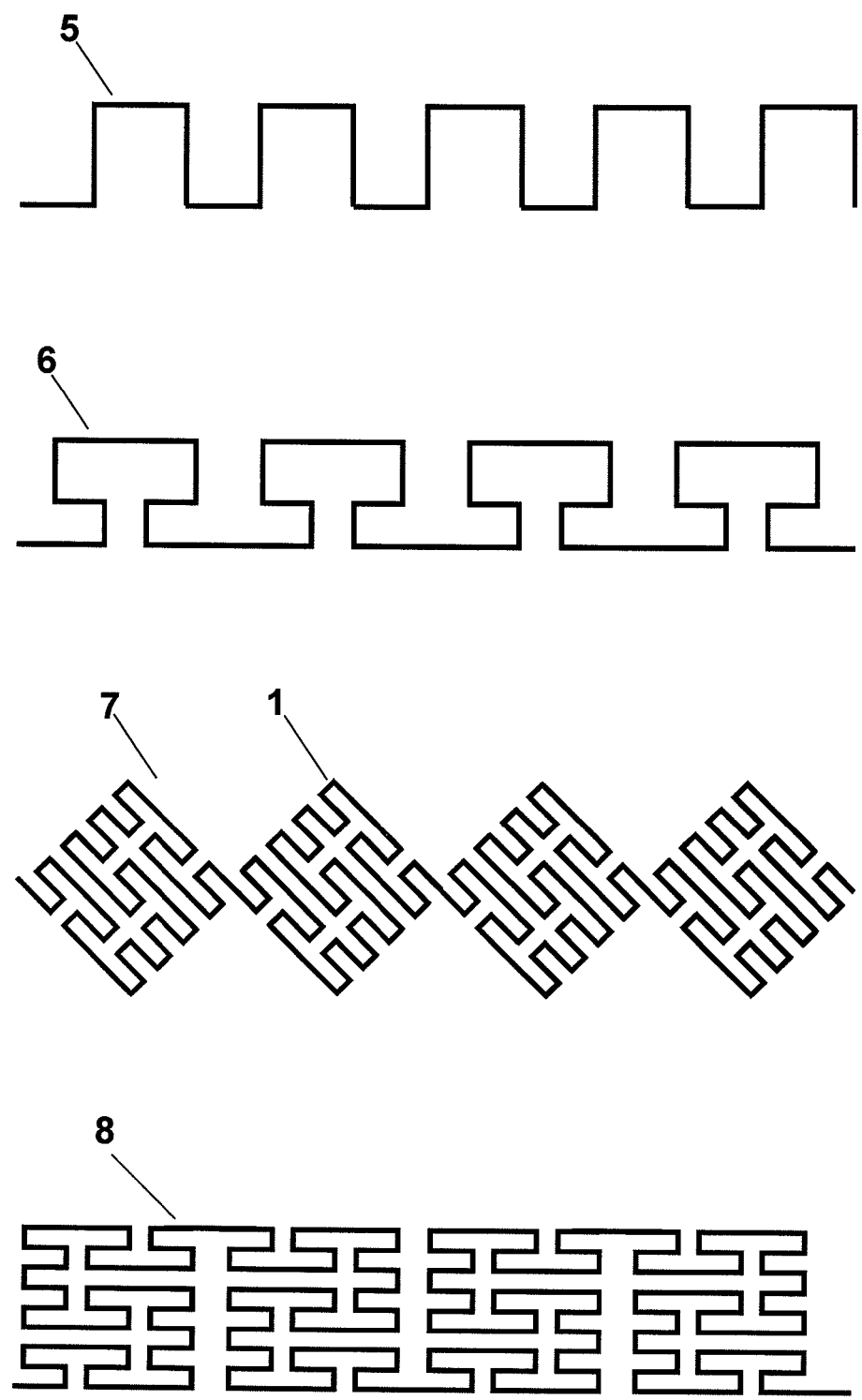
FIG. 2 shows a comparison between two prior art meandering lines (5 and 6) and two SFC periodic curves 7 and 8, constructed from the SZ curve of drawing 1. Periodic Curves 5 and 6 are not SFC because their periods are defined with less than ten segments.
Figure 3:
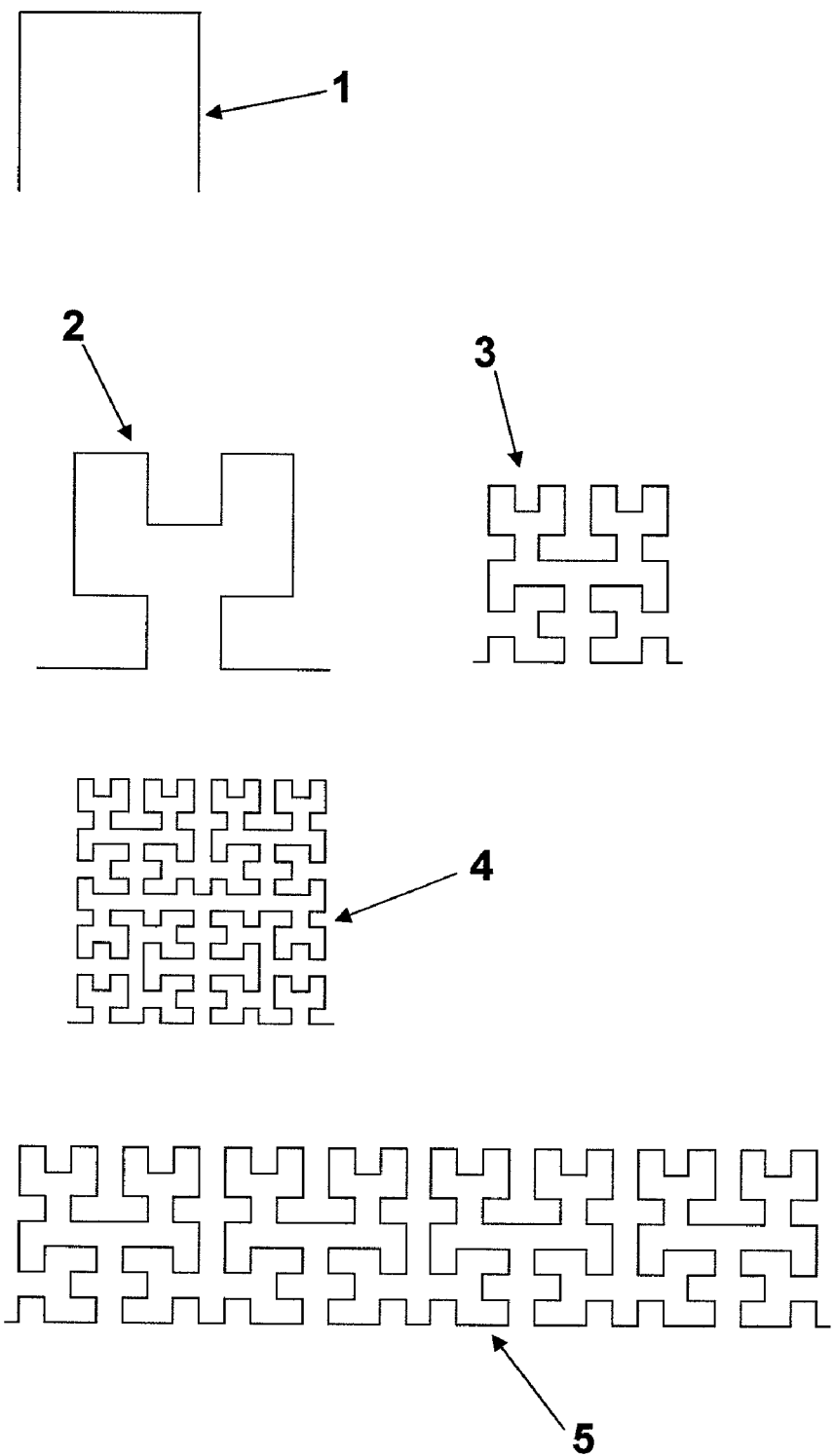
FIG. 3 shows a set of SFC curves (1, 2, 3, 4, 5) inspired on the Hilbert curve and hereafter named as Hilbert curves.
Figure 4:
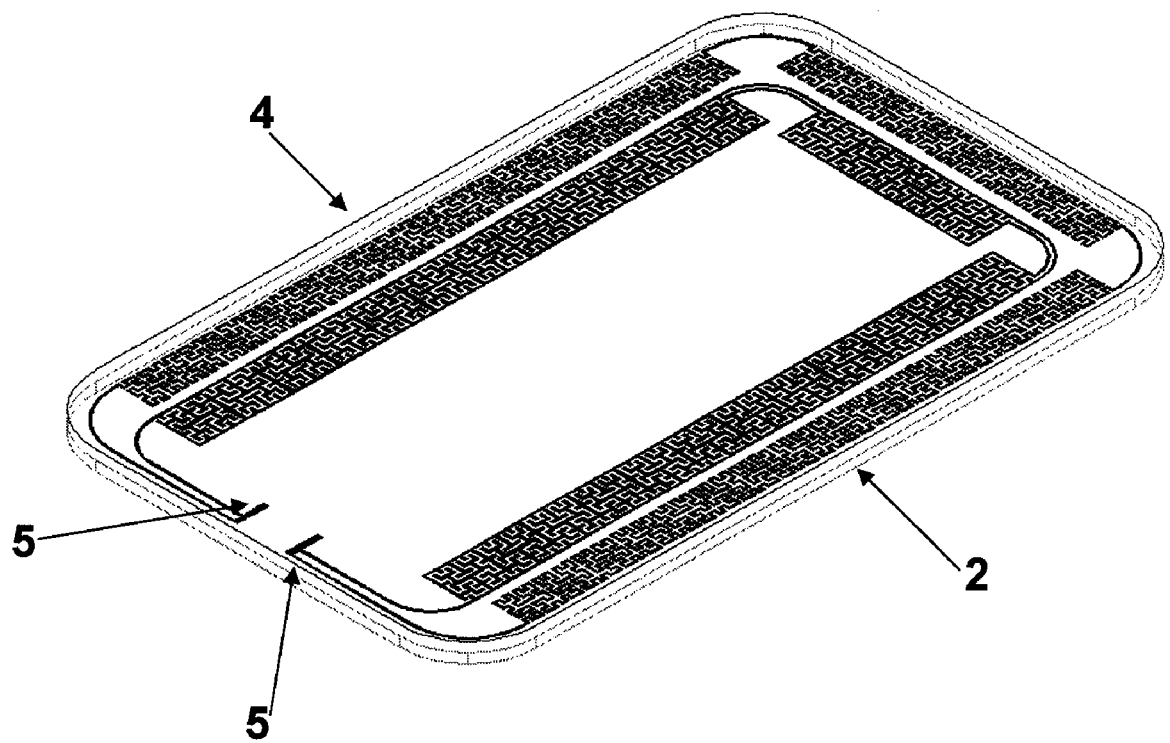
FIG. 4 shows a particular configuration of an electromagnetic sensor for contactless or hybrid cards. It consists on a flat single-turn rounded-corner rectangular loop with part of the straight segments that form the loop shaped as a SFC curve (2), and a coplanar flat capacitor connected in parallel to the loop with its gap shaped as a SFC curve (4). The electromagnetic sensor is connected to the contactless or hybrid card chip at the connection points (5).

FIG. 4 describes, without any limiting purpose, a preferred embodiment of a contactless identification device in particular a contactless or hybrid card comprising a pace-filling enhanced electromagnetic sensor. It is composed of a single-turn loop connected in parallel to a capacitor. A single-turn flat loop electromagnetic sensor in the shape of a round-cornered rectangle has been modified by replacing some of the straight lines that form the sides of the loop by a space-filling curve (SFC) (2). In this particular example, a particular case of a SFC (the Hilbert curve) has been chosen, but other SFC could be used instead. A flat coplanar capacitor is connected in parallel to the ends of the loop electromagnetic sensor. The gap of the flat capacitor has been modified by shaping it as a space-filling curve (SFC) (4). In this particular example, a particular case of a SFC (the Hilbert curve) has been chosen, but other SFC could be used instead. The two ends of the loop and the capacitor form the connecting terminals of the electromagnetic sensor (5).

This electromagnetic sensor can be manufactured, among other techniques, by means of any of the current printed circuit fabrication techniques, by means of conductive ink printed on a dielectric sheet-shaped substrate, by electrolytic etching of part of the metal layer of a metal-dielectric sandwich sheet, etc. The electromagnetic sensor is later on integrated in the manufacturing of contactless or hybrid cards (6). For reasons of external appearance, the electromagnetic sensor is usually integrated in some of the inner layers of the card body. The connecting points of the contactless card chip would be connected to the electromagnetic sensor connecting terminals by means of any of the available procedures, such as for instance using conductive paste, or by direct soldering of the chip connecting points to the electromagnetic sensor terminals. In a hybrid card application, the connecting points of the hybrid card chip would be connected to the electromagnetic sensor connecting terminals by means of conductive paste of some other method to overcome the thickness of the card body between the card surface, where the chip is attached to allow regular contact operation of the card, and the inner layer where the electromagnetic sensor is located.

As it can be appreciated from FIG. 4, the whole electromagnetic sensor structure is located in one single level, without the need of conducting wires or stripes crossing over other parts of the electromagnetic sensor. This quality allows a very simple manufacturing of the electromagnetic sensor, as only one single layer of printed board, or one single dielectric sheet printed with conductive ink, for instance, need to be used. The fact of having all the electromagnetic sensor connection points at the same level as the rest of the electromagnetic sensor structure allows a simpler industrialization of the mechanical tasks required to connect the contactless chip or implant and connect the hybrid card chip (as drilling, depositing of conductive pastes, soldering, etc.).

This electromagnetic sensor architecture is suitable for all the applications where contactless or hybrid cards are of advantage: high volume paying and toll applications (public transportation, public sport events, etc.), person and good identification (access to controlled areas, control of shipment of goods, handling of luggage, product control in chain production environments, etc.), etc.

Figure 5:
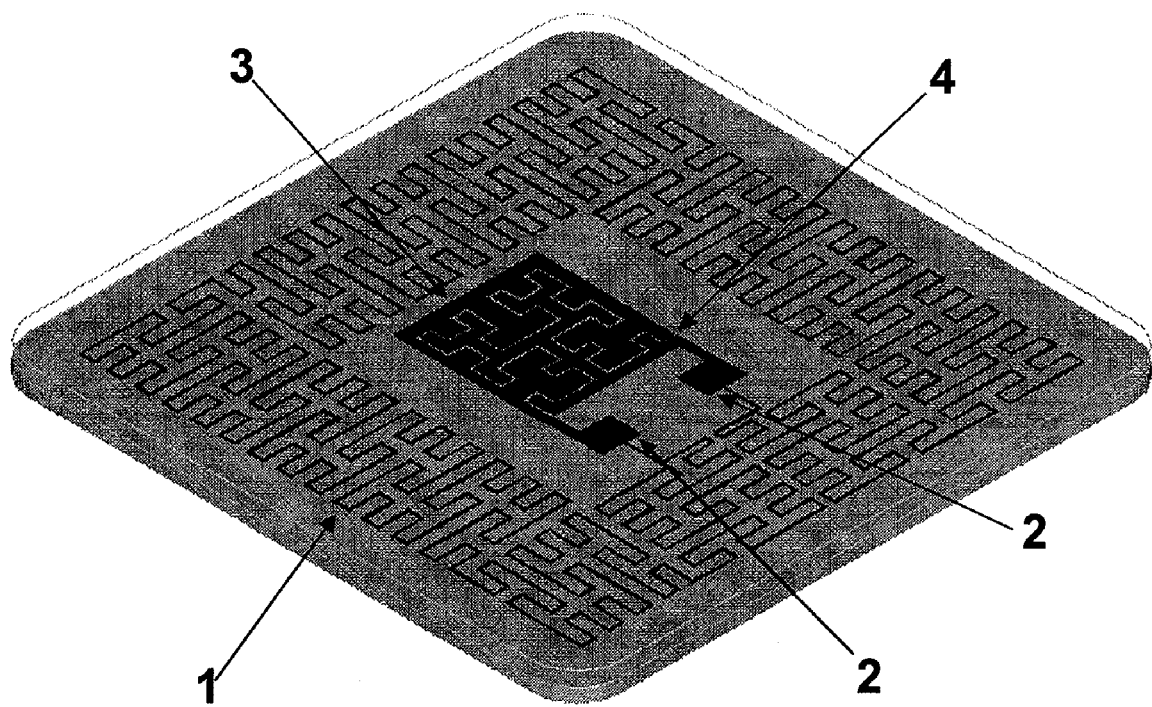
FIG. 5 shows a particular configuration of an electromagnetic sensor for electronic label or tag. It consists on a single turn square flat loop with the straight lines that form the loop shaped as a SFC curve (1), and a coplanar flat capacitor (3) connected in parallel to the loop with its gap (4) shaped as a SFC curve. The electromagnetic sensor is connected to the electronic label chip or electronic tag chip at the connection points (2).

FIG. 5 describes another preferred embodiment of a space-filling enhanced electromagnetic sensor for a electronic label or radio frequency operated tag. A square flat loop has been modified by substituting the straight parts of the loop wire by SFC structures (1). In this particular example, a particular case of a SFC (the SZ curve) has been chosen, but other SFC could be used instead. The two ends of the arms form the connecting terminals of the electromagnetic sensor (2). At the same time, a flat coplanar capacitor (3) is shown connected in parallel to the electromagnetic sensor connection terminals. The shape of the gap of the capacitor (4) has been modified with a SFC curve. In this particular example, a particular case of a SFC (the Hilbert curve) has been chosen, but other SFC could be used instead. The capacitance of the capacitor and the inductance of the loop form a parallel resonant circuit. This electromagnetic sensor can be manufactured, among other techniques, by means of any of the current printed circuit fabrication techniques, by means of conductive ink printed on a dielectric sheet-shaped substrate, etc. The antenna is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals. As it can be appreciated from FIG. 5, the whole electromagnetic sensor structure is located in one single level, without the need of conducting wires or stripes crossing over other parts of the electromagnetic sensor. This quality allows a very simple manufacturing of the electromagnetic sensor, as only one single layer of printed board, or one single dielectric sheet printed with conductive ink, for instance, need to be used. The fact of having all the electromagnetic sensor connection points at the same level as the rest of the electromagnetic sensor structure allows a simpler industrialization of mechanical tasks as drilling, depositing of conductive pastes, soldering, etc. This electromagnetic sensor architecture is suitable for all the applications where radio operated electronic label or electronic tags are of advantage: shopping antitheft applications, contactless intelligent shopping karts, identification of goods and control of stocks in real time, etc.

Figure 6:
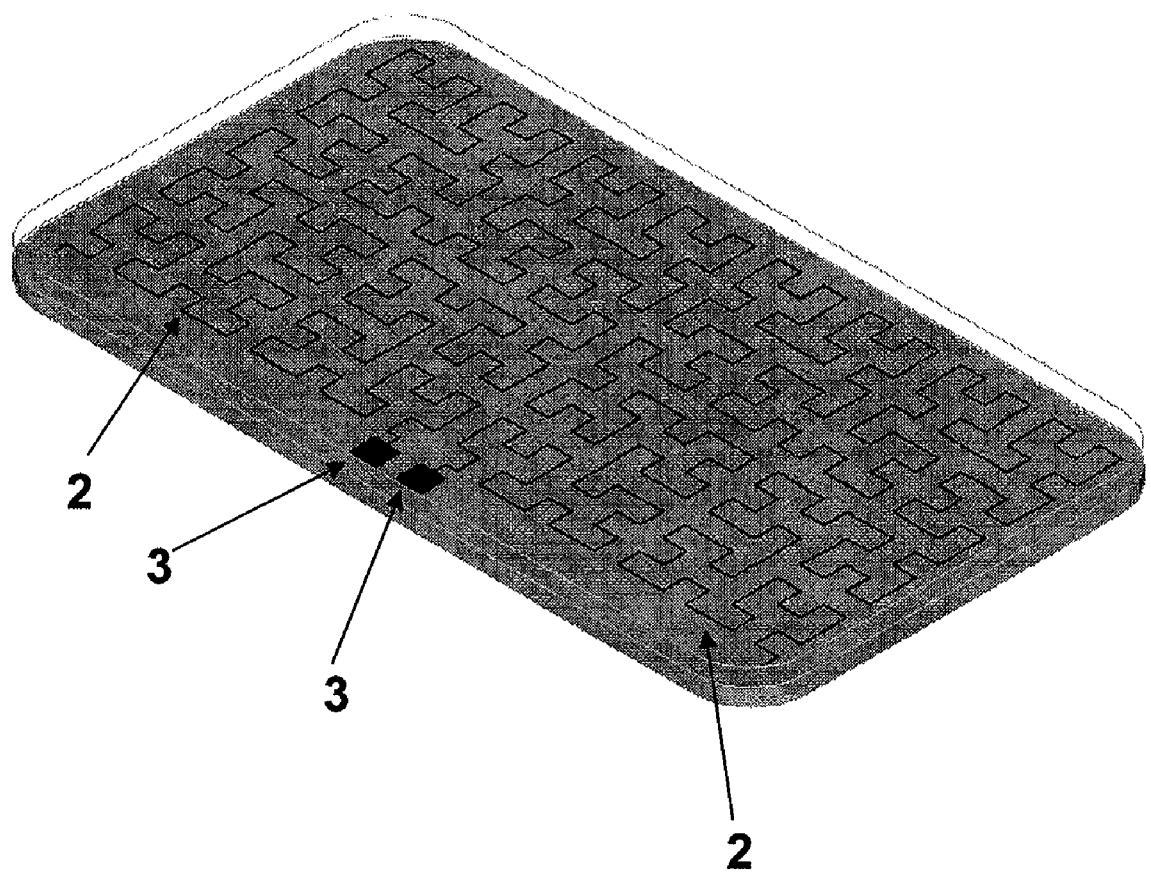
FIG. 6 shows an example of a dipole electromagnetic sensor for an electronic label of radio frequency operated electronic tag, wherein each of the dipole arms (2) is shaped as an SFC curve. The electronic label chip or the electronic tag chip is connected at the terminals of the electromagnetic sensor (3).

Another preferred embodiment for a space-filling enhanced electromagnetic sensor for a electronic label or radio frequency operated tag is shown in FIG. 6. A wire dipole electromagnetic sensor has been modified by substituting the dipole arms (2) by SFC curves. In this particular example, a particular case of a SFC (the Hilbert curve) has been chosen, but other SFC could be used instead. The two ends of the arms form the connecting terminals of the electromagnetic sensor (3). This electromagnetic sensor can be manufactured, among other techniques, by means of any of the current printed circuit fabrication techniques, by means of conductive ink printed on a dielectric sheet-shaped substrate, etc. The electromagnetic sensor is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals.

Figure 7:
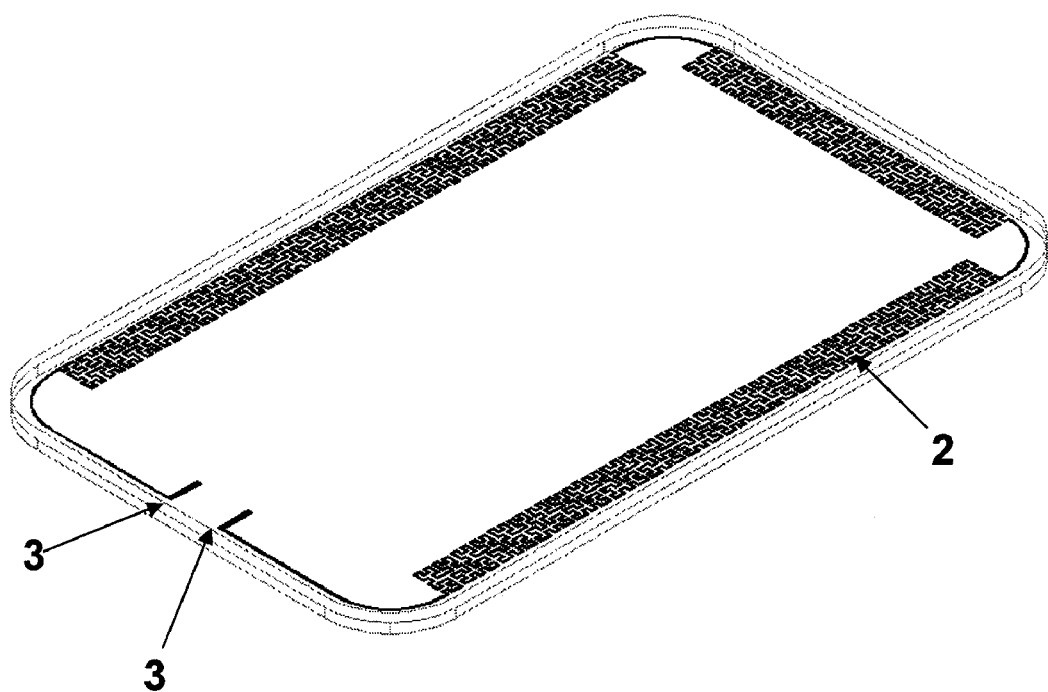
FIG. 7 shows a particular configuration of an electromagnetic sensor for contactless or hybrid cards. It consists on a flat single-turn rounded-corner rectangular loop whit part of the straight segments that form the loop shaped as a SFC curve (2). The electromagnetic sensor is connected to the contactless or hybrid card chip at the connection points (3).

FIG. 7 describes another preferred embodiment of a space-filling enhanced electromagnetic sensor for a contactless or hybrid card. A single-turn flat loop in the shape of a round-cornered rectangle (2) has been modified by replacing some of the straight lines that form the sides of the loop by a space-filling curve (SFC). In this particular example, a particular case of a SFC (the Hilbert curve) has been chosen, but other SFC could be used instead. The two ends of the loop form the connecting terminals of the electromagnetic sensor (3). This electromagnetic sensor can be manufactured, among other techniques, by means of any of the current printed circuit fabrication techniques, by means of conductive ink printed on a dielectric sheet-shaped substrate, by electrolytic etching of part of the metal layer of a metal-dielectric sandwich sheet, etc. The electromagnetic sensor is later on integrated in the manufacturing of contactless or hybrid cards. For reasons of external appearance, the electromagnetic sensor is usually integrated in some of the inner layers of the card body. The connecting points of the contactless card chip would be connected to the electromagnetic sensor connecting terminals by means of conductive paste, or by direct soldering of the chip connecting points to the electromagnetic sensor terminals. In a hybrid card application, the connecting points of the hybrid card chip would be connected to the electromagnetic sensor connecting terminals by means of conductive paste of some other method to overcome the thickness of the card body between the card surface, where the chip is attached to allow regular contact operation of the card, and the inner layer where the electromagnetic sensor is located. With this new single-turn loop electromagnetic sensor architecture the need of wires crossing over other parts of the electromagnetic sensor is eliminated, and therefore the manufacturability of the system is greatly simplified as it is not necessary to include extra layers in the card body to allow the positioning of both electromagnetic sensor connecting terminals at the side of the electromagnetic sensor loop.

Figure 8:
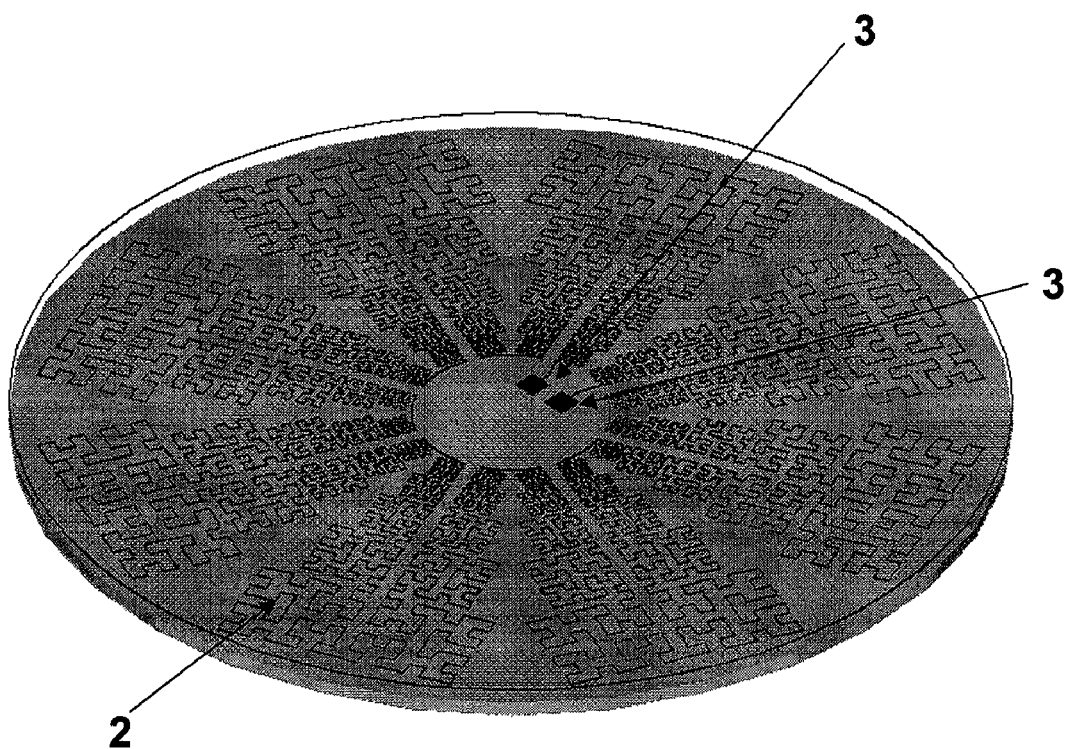
FIG. 8 shows an example of a loop antenna for an electronic label of radio frequency operated electronic tag, wherein a flat single-turn circular loop has been modified by including radially-oriented SFC curves (2). The electronic label chip or the electronic tag chip is connected at the terminals of the electromagnetic sensor (3).

FIG. 8 describes another preferred embodiment of a space-filling enhanced electromagnetic sensor for a electronic label or radio frequency operated tag. A single-turn flat circular loop has been modified by including radially-oriented SFC structures (2) that optimize the distribution of the electromagnetic sensor wire over the surface of the tag in order to maximize the performance of the electromagnetic sensor. In this particular example, a particular case of a SFC (the Hilbert curve) has been chosen, but other SFC could be used instead. The two ends of the loop form the connecting terminals of the electromagnetic sensor (3). This electromagnetic sensor can be manufactured, among other techniques, by means of any of the current printed circuit fabrication techniques, by means of conductive ink printed on a dielectric sheet-shaped substrate, etc. The electromagnetic sensor is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals.

Figure 9:
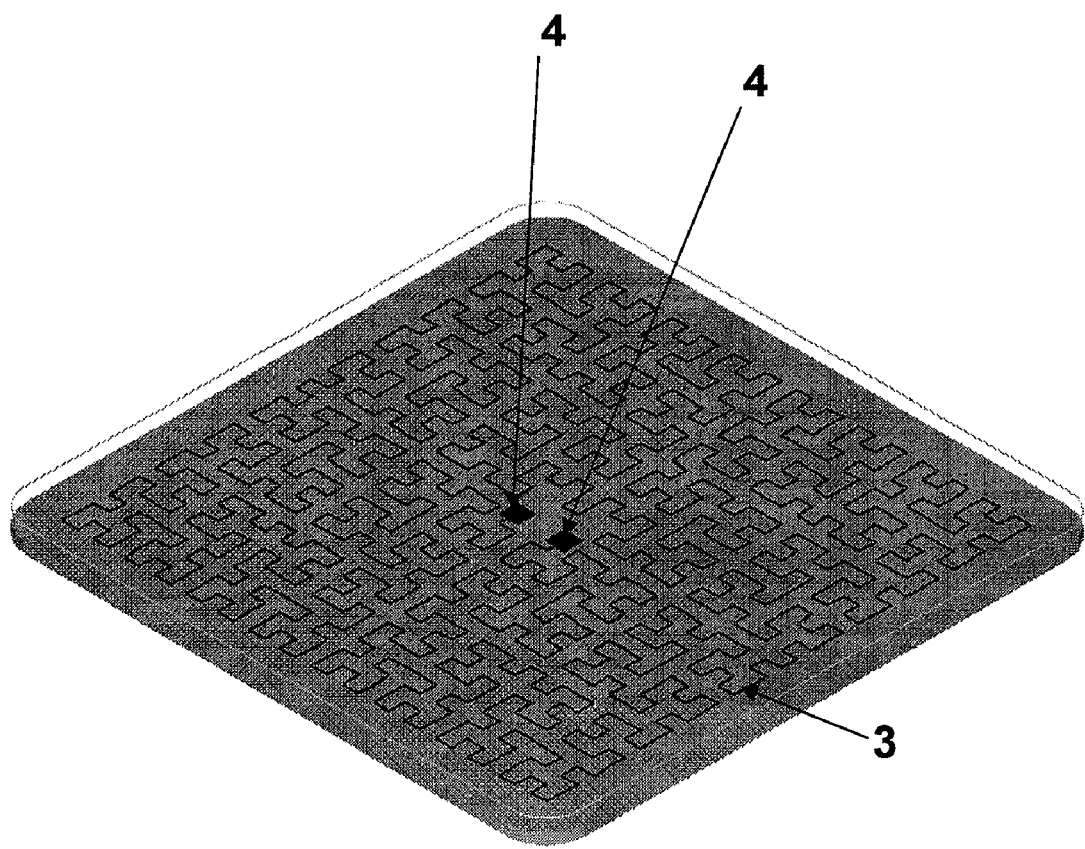
FIG. 9 shows an example of a lop electromagnetic sensor for an electronic label or radio frequency operated electronic tag, where in a flat single-turn square loop has been modified by including a SFC curve (3). The electronic label chip or the electronic tag chip is connected at the terminals of the electromagnetic sensor (4).
Figure 10:
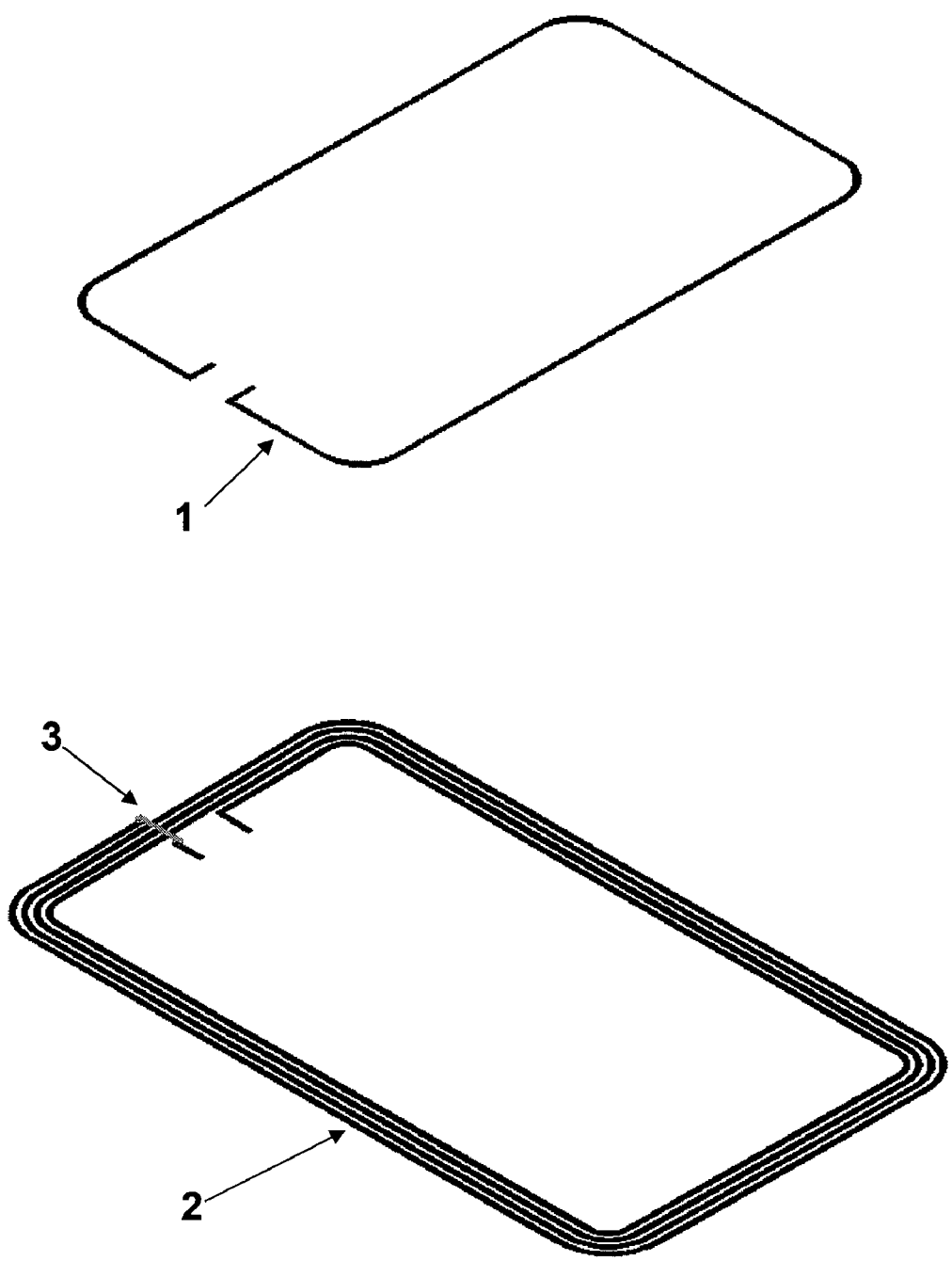
FIG. 10 shows two examples of current art in the design of electromagnetic sensor for contactless or hybrid cards. A single-turn flat loop (1) and a multiple-turn flat loop (2) are presented. The most important detail is the use of a wire running at a higher (3) level to overcome the need to cross over the loop windings and locate the two electromagnetic sensor contacts in the same side of the loop.

FIG. 9 describes another preferred embodiment of a space-filling enhanced electromagnetic sensor for a electronic label or radio frequency operated tag. A single-turn flat squared loop has been modified by including SFC curves (3) that optimize the distribution of the electromagnetic sensor wire over the surface of the tag in order to maximize the performance of the electromagnetic sensor. In this particular example, a particular case of a SFC (the Hilbert curve) has been chosen, but other SFC could be used instead. The two, ends of the loop form the connecting terminals of the electromagnetic sensor (4). This electromagnetic sensor can be manufactured, among other techniques, by means of any of the current printed circuit fabrication techniques, by means of conductive ink printed on a dielectric sheet-shaped substrate, etc. The electromagnetic sensor is later on incorporated into the manufacturing of the electronic label or radio frequency operated tag. The connecting points of the contactless electronic label chip or radio frequency operated tag chip would be connected to the electromagnetic sensor connecting terminals by means of conductive paste, or by direct soldering of the chip connecting points to the electromagnetic sensor terminals.

Figure 11:
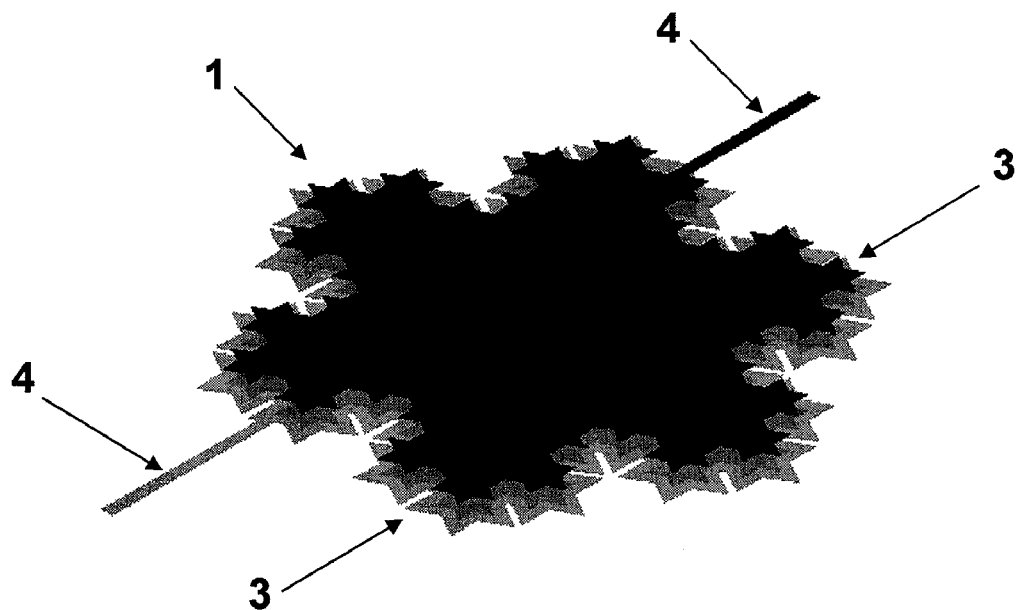
FIG. 11 shows two examples of capacitive elements with space filling curves applied to their shapes. In a parallel plate capacitor (1), the conductive surfaces (3) have been shaped a space-filling curve. In a coplanar capacitor (2), the shape of the gap between the conductive surfaces (5) has been shaped following a space-filling curve.
Figure 11:
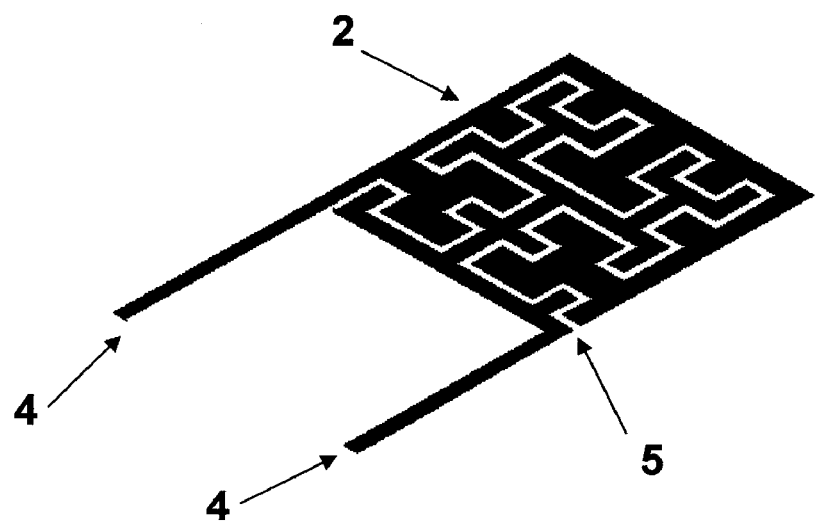

FIG. 11 describes, without any limiting purpose, two examples of preferred embodiments of capacitors with the application of space-filling curves to their shape. In a parallel plate capacitor (1) the two parallel conducting surfaces have been shaped following a space-filling curve. The capacitance of the element depends on the thickness of the insulating layer between the parallel plates, the kind of dielectric between the plates, and the effective area of the plates. Each of the two connecting terminals of the element (4) is connected to one of the plates. This capacitor can be manufactured, among other techniques, by means of any of the current printed circuit fabrication techniques, by means of conductive ink printed on a dielectric sheet-shaped substrate, etc., taking always into account that two conductive layers, separated by an insulating layer of a determined thickness, are required. The final element would be encapsulated with some dielectric material in order to prevent damaging of the parallel plates, while leaving the connection terminals out of the encapsulation. In a coplanar capacitor (2), and taking into account that the capacitance value is determined mainly by the length and the width of the gap between the coplanar conductive surfaces (5), the gap has been shaped following a space-filling curve, thus maximizing the length of the gap without increasing the total area of the component. This capacitor can be manufactured, among other techniques, by means of any of the current printed circuit fabrication techniques, by means of conductive ink printed on a dielectric sheet-shaped substrate, etc. In this type of capacitors, only one layer of conductive surface is required, making it especially suitable for mass production. After the shaping of the two coplanar conductive surfaces, the whole structure would be encapsulated with some dielectric material in order to prevent damaging of the conductive surfaces, while leaving the connection terminals (4) out of the encapsulation.

Although various embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

The invention claimed is:

1. An antenna, comprising:
a conducting wire including a first single-turn loop;
a capacitor coupled to the conducting wire in parallel, the capacitor having a first conductor spaced apart from a second conductor by a gap, the first conductor, the second conductor, and the gap being arranged as a second single-turn loop that is generally co-planar with the first single-turn loop; and
wherein at least one of the conducting wire and the gap of the capacitor includes a portion shaped as a space-filling curve having a plurality of connected straight segments spatially arranged so that none of the adjacent and connected segments form a straight segment longer than the individual segments, the straight segments having generally the same length.

2. The antenna of claim 1 wherein:
the space-filling curve is a first space-filling curve;
the first single-turn loop has a shape of a round-cornered rectangle arranged between a first terminal and a second terminal spaced apart from the first terminal, the first single-turn loop at least partially surrounding the second single-turn loop;
the first conductor of the capacitor is coupled to the conducting wire at the first terminal;
the second conductor of the capacitor is coupled to the conducting wire at the second terminal;
the conducting wire includes a portion shaped as the first space-filling curve;
the gap of the capacitor includes a portion shaped as a second space-filling curve having a plurality of connected straight segments spatially arranged so that none of the adjacent and connected segments form a straight segment longer than the individual segments; and at least one of the first and second space-filling curves includes at least a portion of a Hilbert curve.

3. The antenna of claim 1 wherein:

the first single-turn loop has a shape of a square with a first terminal and a second terminal spaced apart from the first terminal, the first and second terminals being in an internal region of the square;

the capacitor is in the internal region of the square with the first conductor of the capacitor coupled to the conducting wire at the first terminal and the second conductor of the capacitor coupled to the conducting wire at the second terminal;

the conducting wire includes a portion shaped as at least a portion of a SZ curve; and the gap of the capacitor includes a portion shaped as at least a portion of a Hilbert curve.

4. The antenna of claim 1 wherein:

the space-filling curve is a first space-filling curve;

the conducting wire includes a portion shaped as the first space-filling curve;

the gap of the capacitor includes a portion shaped as a second space-filling curve having a plurality of connected straight segments spatially arranged so that none of the adjacent and connected segments form a straight segment longer than the individual segments; and at least one of the first and second space-filling curves includes at least a portion of a Hilbert curve.

5. The antenna of claim 1 wherein:

the space-filling curve is a first space-filling curve;

the conducting wire includes a portion shaped as the first space-filling curve;

the gap of the capacitor includes a portion shaped as a second space-filling curve having a plurality of connected straight segments spatially arranged so that none of the adjacent and connected segments form a straight segment longer than the individual segments; and the first space-filling curve is different than the second space-filling curve.

6. The antenna of claim 1 wherein:

the space-filling curve is a first space-filling curve having a first number of connected straight segments spatially arranged so that none of the adjacent and connected segments form a straight segment longer than the individual segments;

the conducting wire includes a portion shaped as the first space-filling curve;

the gap of the capacitor includes a portion shaped as a second space-filling curve having a second number of connected straight segments spatially arranged so that none of the adjacent and connected segments form a straight segment longer than the individual segments; and the first number equals the second number.

7. The antenna of claim 1 wherein the space-filling curve includes at least ten segments, each of which is smaller than a tenth of a free-space operating wavelength.

8. The antenna of claim 1 wherein the space-filling curve is periodic along a fixed straight direction when a period of the space-filling curve is defined by a non-periodic curve comprising at least ten connected segments.

9. The antenna of claim 1 wherein the space-filling curve is periodic along a fixed straight direction when a period of the space-filling curve is defined by a non-periodic curve comprising at least ten connected segments, and wherein the individual ten connected segments are smaller than a tenth of a free-space operating wavelength.

10. An electronic device, comprising:

a conductive circuit having a first conducting arm and a second conducting arm, a first end of the first conducting arm forming a first terminal and a second end of the second conducting arm forming a second terminal;

a capacitive element having a first conducting surface and a second conducting surface spaced apart from the first conducting surface by a gap, the first and second conducting surfaces being on a common layer as the first and second conducting arms of the conductive circuit, the first conducting surface being coupled to the first conducting arm at the first terminal, the second conducting surface being coupled to the second conducting arm at the second terminal; and wherein at least one of the first and second conducting arms, the first and second conducting surfaces, and the gap includes a portion shaped as a space-filling curve having a plurality of connected straight segments spatially arranged so that none of the adjacent and connected segments form a straight segment longer than the individual segments.

11. The electronic device of claim 10 wherein the first and second conducting arms of the conductive circuit are configured as a dipole.

12. The electronic device of claim 10 wherein:

the first and second conducting arms of the conductive circuit are configured as a dipole; and at least one of the first and second conducting arms includes at least ten segments, each of which is smaller than a tenth of a free-space operating wavelength.

13. The electronic device of claim 10 wherein:

the first and second conducting arms of the conductive circuit are configured as a dipole; and both the first and second space-filling curves include at least a portion of a Hilbert curve that includes at least ten segments, each of which is smaller than a tenth of a free-space operating wavelength.

14. The electronic device of claim 10 wherein:

the first and second conducting arms of the conductive circuit are configured as a dipole;

both the first and second space-filling curves include at least a portion of a Hilbert curve that includes at least ten segments, each of which is smaller than a tenth of a free-space operating wavelength; and at least one of the first and second conducting surfaces and the gap includes a portion of a SZ curve.

15. An identification device, comprising:

an electromagnetic sensor configured as a dipole having a first terminal and a second terminal spaced apart from the first terminal;

a generally planar capacitor on a common layer as the electromagnetic sensor; and wherein at least a portion of at least one of the electromagnetic sensor and the capacitor includes a portion shaped as a space-filling curve having a plurality of connected straight segments spatially arranged so that none of the adjacent and connected segments form a straight segment longer than the individual segments.

16. The identification device of claim 15 wherein:

the electromagnetic sensor includes a first conducting arm carrying a first terminal and a second conducting arm carrying a second terminal;

the capacitor includes a first conducting surface and a second conducting surface separated from the first conducting surface by a gap, the capacitor being generally co-planar with the electromagnetic sensor, wherein the first and second surfaces being electrical coupled to the first and second terminals, respectively; and at least one of the first and second conducting arms, the first and second conducting surfaces, and the gap includes a portion shaped as a space-filling curve having at least ten straight segments spatially arranged so that none of the adjacent and connected segments form a straight segment longer than the individual segments, each of the ten segments being smaller than a tenth of a free-space operating wavelength.

* * * * *